Jan. 15, 1946. G. A. GRUSS 2,392,916
MEASURING INSTRUMENT
Filed June 20, 1942 4 Sheets-Sheet 1
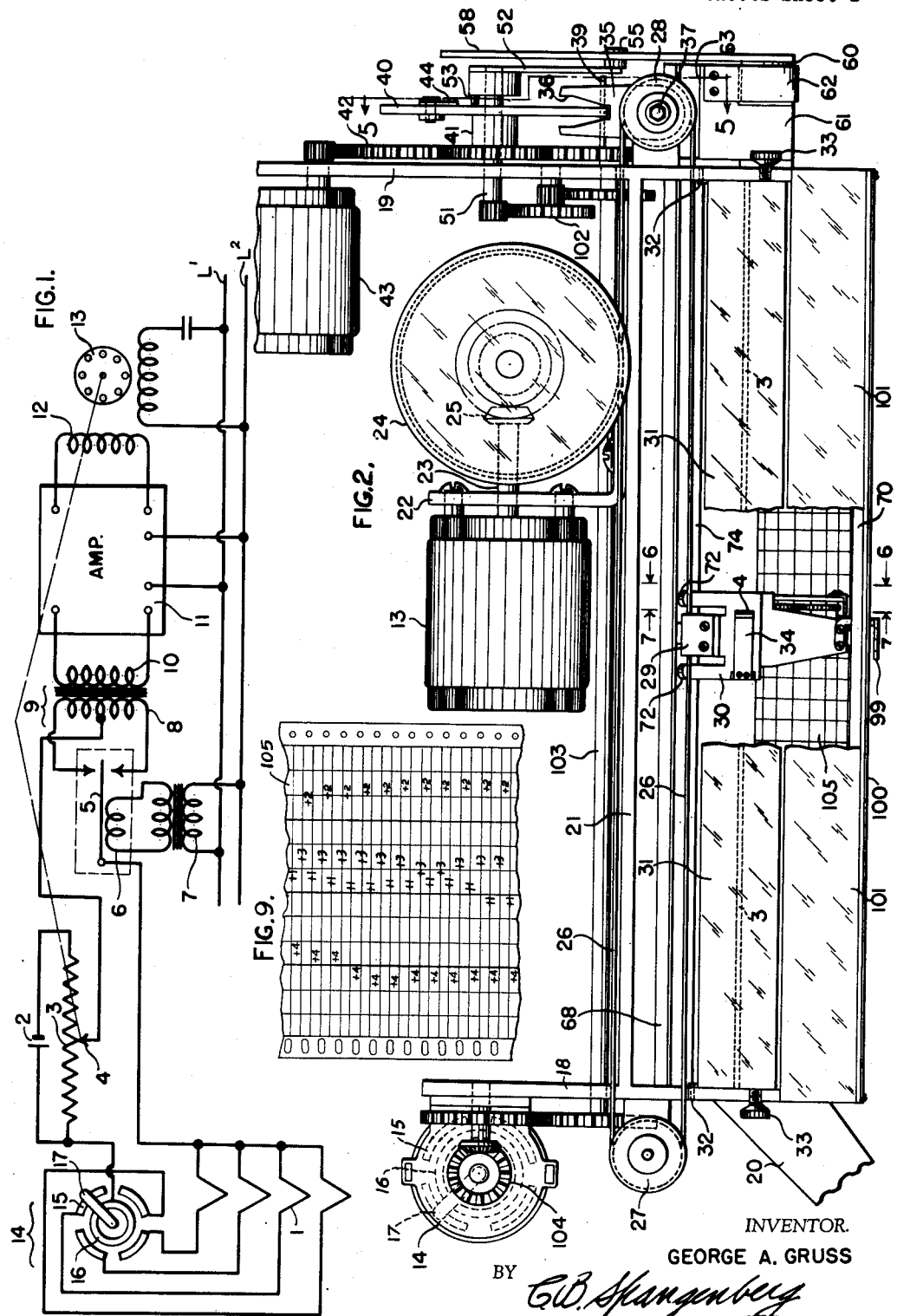
INVENTOR.
GEORGE A. GRUSS
BY G.B. Spangenberg
ATTORNEY INVENTOR.
GEORGE A. GRUSS
BY E. B. Spangenberg
ATTORNEY Jan. 15, 1946.  G. A. GRUSS  2,392,916
MEASURING INSTRUMENT
Filed June 20, 1942  4 Sheets-Sheet 3
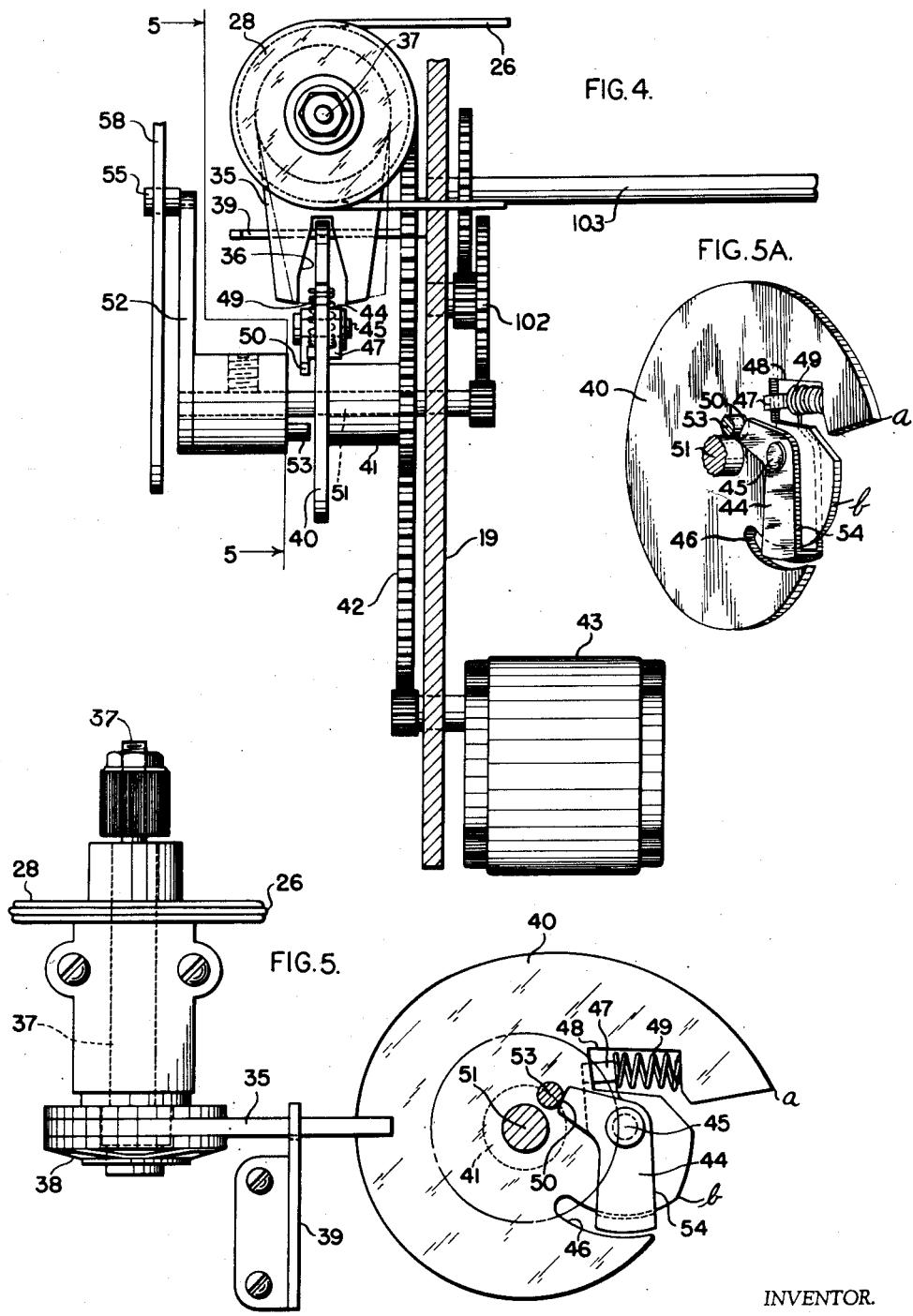
INVENTOR.
GEORGE A. GRUSS
BY C. O. Spangenberg
ATTORNEY

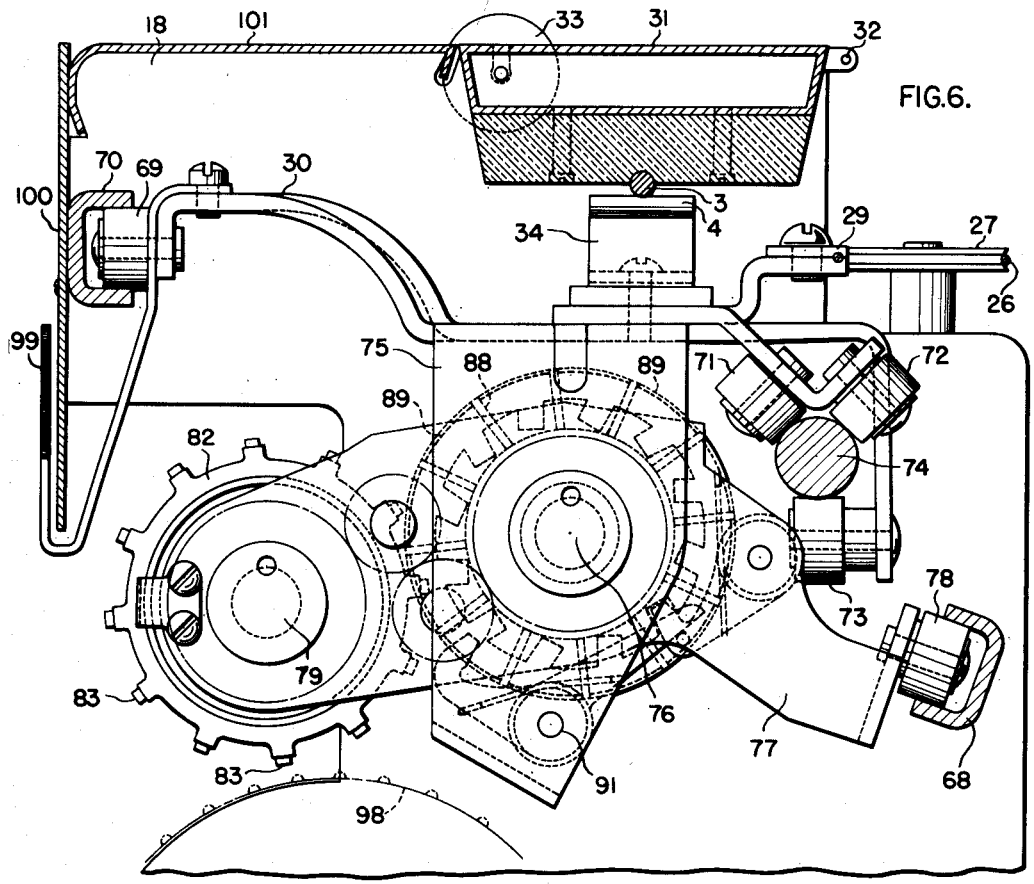
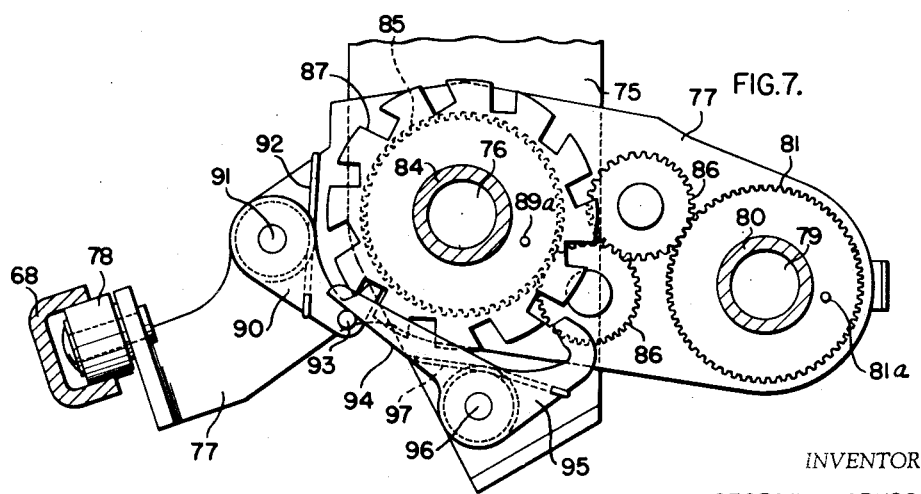

Patented Jan. 15, 1946

2,392,916

UNITED STATES PATENT OFFICE 2,392,916

MEASURING INSTRUMENT

George A. Gruss, Bridgeport, Conn., assignor to The Brown Instrument Company, Philadelphia, Pa., a corporation of Pennsylvania Application June 20, 1942, Serial No. 447,866

13 Claims. (Cl. 234—68)

The present invention relates to recording instruments, and more particularly to self-balancing potentiometers that are adapted to successively measure and record on a single chart the value of a plurality of conditions.

Instruments of the type to which this invention relates are customarily provided with some means to record the value of each condition being measured in an individual manner. After each measurement has been made the recording mechanism is adjusted to bring a new recording character into position and the instrument is connected with another primary measuring element. These elements are usually thermocouples subjected to temperature and will be so described herein, but it will be understood that other types of measuring elements may be used if desired and the instrument will work in the same manner in each case.

In multiple recording instruments it is generally the custom to allow a predetermined time to elapse after the instrument is connected to one thermocouple before a record is made and the instrument is connected to the next thermocouple. This means that some predetermined time is required for a record to be made of the temperature of each thermocouple. The interval of time between each recording must necessarily be at least equal to the time required for the instrument to move the recording mechanism from a position corresponding to the minimum to a position corresponding to the maximum values to be recorded. This being the case, if the records to be made in sequence are less than this maximum distance apart, some period of time is lost after the recording member is moved to its proper position and before the record is made. The result of operation of this sort is that the instrument makes fewer records than it is capable of making.

It is an object of this invention to provide an instrument of the type above described that differs from instruments of the prior art in that a novel arrangement is provided to produce a record immediately after the recording mechanism has been properly positioned. The instrument of this invention is provided with a detecting mechanism that is responsive to movement of the recording element, and acts to produce a record immediately after the recording element has come to rest. Thus only as much time is needed to make a record of the temperature of each thermocouple as is required for the recording mechanism to be moved to the right position and for the recording operations to take place. With an arrangement of this sort there is no lost time and as many records can be made as the instrument is capable of making. This is particularly important in a case in which the temperatures are fluctuating rapidly.

A further object of the invention is to provide a mechanism for use in a self-balancing measuring instrument which will operate to make a record of the temperature being measured as soon as the instrument comes into balance.

Another object of the invention is to provide a novel variable speed means to drive a chart upon which the record of the temperature is made. If the temperatures to be recorded are grouped close together the records will overlap each other unless the chart is moving rapidly. On the other hand, if the temperature records are widely separated a longer time interval will occur between successive records of the temperature and the chart will not have to be moved so rapidly in order to have them well spaced.

A further object of the invention is to have the chart driving mechanism of a recording instrument driven by the same means that operates the detector mechanism which indicates when the recorder is properly positioned. This arrangement insures that the chart drive is synchronized with the recording operation and does away with the necessity of a plurality of individual driving mechanisms.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Figure 1 is a wiring diagram of a type of potentiometer circuit that may be used with the applicant's instrument.

Figure 2 is a top view of the instrument showing its actuating mechanism.

Figure 4 is a top view of the detecting mechanism.

Figure 5 is a side view of a portion of the detecting mechanism taken on line 5—5 of Figure 2 and is generally similar to a view taken on line 5—5 of Figure 4.

Figure 5A is a perspective view of a portion of a detecting mechanism.

Figure 6 is a side view, partly in section, of the carriage taken on line 6—6 of Figure 2.

Figure 7 is a view of the print wheel rotating mechanism taken on line 7—7 of Figure 2.

Figure 9 shows a portion of a chart produced by the instrument of the present case.

Figures 3, 8:
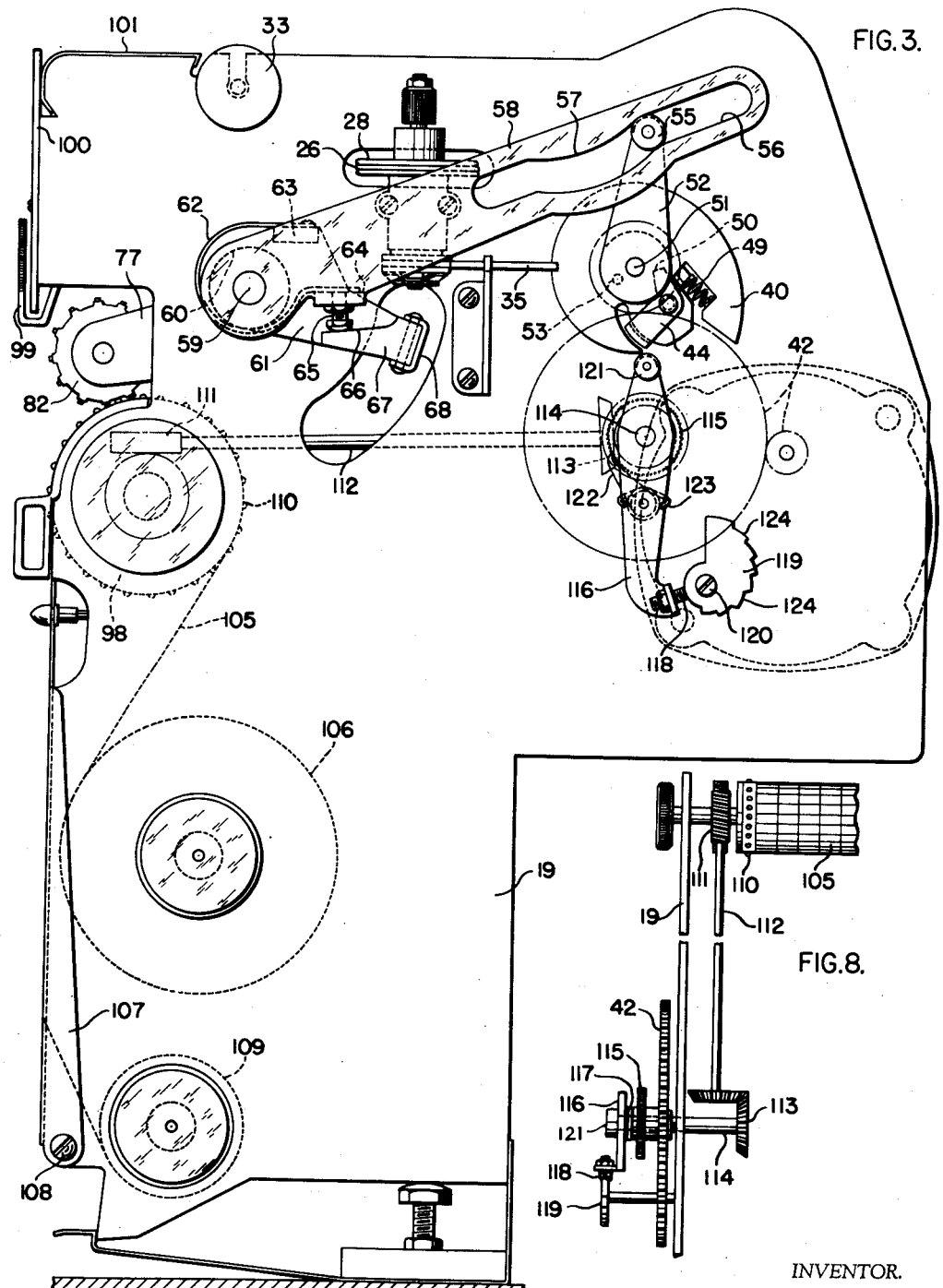
Figure 3 is a view of the right hand side plate of the instrument and the mechanism associated therewith.
Figure 8 is a view of the chart driving mechanism.

Referring first to Figure 1, there is illustrated a high speed potentiometer measuring system which may be used with the measuring instrument of my invention. In this circuit a thermocouple 1, which is responsive to the temperature to be measured, is included in the potentiometer circuit which also includes a source of potential 2 and a slidewire 3 that is connected across the source. The voltage of the thermocouple is opposed to the potential drop across a variable portion of the slidewire 3 as determined by the position of a contact 4 along the slidewire.

Connected in series with the thermocouple 1 and the contact 4 is a vibrator 5 which is energized by the vibrator mechanism 6 and is connected through a transformer 7 to lines L¹ and L². The contact is also connected with the primary winding 8 of a transformer 9. The vibrator 5 is adapted to open and close the circuit in synchronism with the alternating current thereby impressing upon the transformer 9 a pulsating current in a direction and of a magnitude depending upon the direction of potentiometer unbalance. Transformer secondary winding 10 is connected to an electronic amplifier 11 that is also energized by conductors L¹ and L² and the output of the amplifier is connected to one field winding 12 of the two phase motor 13, another winding of which is connected to lines L¹ and L². The motor 13 will thus be energized for rotation in one direction or the other depending upon the phase in the winding 12 which will depend upon the direction of the unbalance of the potentiometer circuit, and the motor is so connected to the contact 4 as to move the latter in a direction to rebalance the potentiometer system. As will be understood the thermocouple 1 may be directly inserted in the furnace to measure the temperature thereof or may be the thermocouple or thermopile of a radiation pyrometer sighted on an object, the temperature of which is to be measured. The instrument can be connected to any one of a number of thermocouples by means of the selector switch 14. To this end each thermocouple is connected at one of its junctions directly to the vibrator mechanism 5 and at its other junction to an individual segment 15. These segments may be connected to a common segment 16 that is in the potentiometer circuit by means of a rotary switch arm 17. Therefore, by merely rotating the arm 17, any one of the thermocouples can be inserted in the circuit and the instrument will successively move the contact 4 to a position corresponding to the temperature of each of these thermocouples.

The instrument itself is housed in a suitable casing which is not shown. The mechanism of the potentiometer is mounted on two side plates 18 and 19 that are rigidly attached together to form a framework. Extending from one of the plates 18 is a member 20 that forms a hinge bracket by means of which the instrument mechanism can be pivotally mounted in an instrument casing. Attached to a cross member 21 extending between the side plates is a bracket 22 that supports the contact driving motor 13. The shaft 23 of this motor drives a cable drive drum 24 by means of gearing 25. This cable drum is suitably mounted in the instrument framework and has wrapped around it a cable 26 which passes from the drum 24 around pulleys 27 and 28 that are located outside of the side plates and journaled on suitable brackets. As the cable drum is rotated in one direction or the other by the motor 13, a carriage 30 is moved back and forth between the side plates of the instrument by means of a clamp 29 which is used to attach the carriage to the cable. Mounted above the carriage and extending between the side plates is a slidewire support 31 which, as shown in Fig. 6, has the slidewire 3 fastened to its lower surface. This support is pivoted in the side plates at 32 and is provided with clamp screws 33 to hold it rigidly in place during the operation of the instrument. Attached to the upper surface of the carriage 30 is a leaf spring 34 to the end of which is fastened the contact 4. Therefore, as the carriage is moved back and forth between the side plates of the instrument the slidewire contact will be moved along the slidewire to rebalance the potentiometer circuit. Therefore, the position of the carriage may be taken as a measure of the temperature to which the thermocouple at that time connected to the circuit is subjected. The slidewire support is pivoted in a manner shown so that it can be moved around its pivot in order to be cleaned when this is necessary. Since the slidewire is on the lower side of 31, it would be inaccessible unless some arrangement such as the one shown herein was used.

Inasmuch as the motor 13 is continually run in one direction or the other to move the carriage 30 in response to any potentiometer unbalance, some means must be supplied on the instrument which is responsive to the stopping of the carriage in order that a record may be made by the same of its position and, therefore, the temperature of the thermocouple. A detecting mechanism which is now to be described is used for this purpose.

A movable part 35 having a V shaped notch 36 formed in one of its edges is frictionally attached to the shaft 37 of the pulley 28 by means of a spring washer 38 so that as the pulley is rotated the part 35 will be moved therewith in either direction until it strikes a suitable stop at which time the washer 38 will permit relative movement between the pulley 28 and the part 35. A backing plate 39 for the part 35 is mounted below the same and is attached to the side plate 19. This plate serves to prevent any undue strain being placed on the shaft 37 during the operation of the device.

Cooperating with the V notch in the part 35 is a cam 40. This cam is mounted on a journal 41 and is driven through gearing 42 by a constant speed motor 43. In operating, the cam periodically moves its high portion into the V slot 36 to return the part 35 to the position shown in Fig. 4. If the motor 13 has been running it will move the cable 26 to rotate pulley 28. This acting through the friction washer 38 will move part 35 out of the position shown in Fig. 4 to its dot-dash line position or in the opposite direction from that shown in dot-dash lines. Thereafter as the cam 40 rotates it will engage one of the sides of the notch to periodically return the part 35 to its neutral position. The part 35 is adapted to control a drive mechanism which operates the printing mechanism and the switch 14 for connecting the instrument to a new thermocouple if the pen carriage has been properly positioned.

A U shaped pawl 44 is pivoted at 45 on the cam 40 in such a manner that its cross member can move in an arcuate slot 46 formed in the cam. One of the legs of the U is bent to form an abutment 47 that is forced against an edge of an opening 48 by means of a spring 49. This spring serves to normally keep the pawl in the position relative to the cam shown in Fig. 5. The pawl may be moved out of this position, however, by engagement of its surface 54 with the part 35, and in so doing moves its end 50 clockwise from the position shown so that it will be a further radial distance from the center of the cam. Extending through the cam 40 and its journal 41 and supporting them for rotation is a shaft 51 which is journalled in the side plate 19. This shaft has attached to its outer end a crank 52 that has provided on its hub a drive pin 53 which is positioned in the path of the end 50 of pawl 44 when the latter is in its normal position.

In the operation of the instrument, if the part 35 has not been moved from its neutral position shown in Fig. 4 the end 50 of the pawl 44 will engage the pin 53 and will act to rotate the crank 52 and shaft 51. If, however, the instrument is not in balance and the motor 13 is still driving the carriage 30 the shaft 37 of the pulley will be rotating in one direction or the other and will, therefore, move the part 35 against one side or the other of cam 40 to hold it there due to the frictional engagement between 37 and 35. As the cam 40 rotates counterclockwise it will move part 35 back to its neutral position at the time the point a of the cam passes through the deepest portion of the notch. If at this time the carriage is still being moved the part 35 will be moved to its dot-dash line position prior to the time that the point b on the cam 44 is rotated to a position to be engaged by part 35. One of the ends of the V notch will thereupon engage the surface 54 of the pawl 44 and move the pawl in a clockwise direction in Fig. 5 until its end 50 is beyond the pin 53. The pin 53 will then remain stationary during the rest of the rotation of the cam 40. If the carriage is still being moved the next time the cam 40 rotates to bring point a into the notch of the part 35, the same operation will be repeated. If, however, the carriage 30 has reached its proper position, there will be no movement of part 35 after the cam has returned it to its neutral position. In this case the outer ends of the notch 36 are far enough apart so that they will not engage the surface 54 of the pawl 40 and the end 50 of this pawl will engage the pin 53 and rotate the crank 52. Rotation of the crank 52 serves to perform three functions of the instrument; the first is to produce a record of the position of the carriage; the second is to bring a new printing character into printing position, and the third is to rotate the arm 17 in order to connect a new thermocouple into the potentiometer circuit.

The first of these operations is performed by a roller 55 that is mounted on the outer end of crank 52. This roller is received by a slot 56 having a curved portion 57, which is formed in a lever 58 that is pivoted around a shaft 59. A casting forming a second lever 61 is also pivoted on the shaft 59 and is normally held in a given angular relation with respect to the lever 58 by means of a spring 62. This spring is attached at one end to a projection 63 on the casting 61 and at its other end to an inturned edge 64 on the lever 58. The angular relation between the lever 58 and the casting 61 may be altered by adjusting a screw 65 which is threaded into the edge 64 and whose head bears on the surface 66 of a second projection 67 of the casting 61.

In the operation of the lever 58 the parts start from the positions in which they are shown in Fig. 3. As the cam 40 and its pawl 44 is rotated counterclockwise, assuming that the carriage 30 has come to rest, the end 50 of pawl 44 will engage the pin 53 and turn the crank 52 along with the cam. As this turning movement starts the roller 55 bearing against the curved portion 57 of the slot 56 will first move lever 58 counterclockwise around its pivot and upon continued movement thereof will move the lever 58 clockwise and then counterclockwise until the roller 55 returns to the position shown in Fig. 3. At this time, if the part 35 has moved out of its neutral position it will engage the pawl 44 to disconnect the drive between the cam and the crank 52 to again stop the parts in the position shown in Figure 3.

Movement of the lever 58 and the casting 61 therewith will first raise and then lower a channel member 68 that is fastened to the outer end of the lever 61. The initial upper movement of this member, in a manner to be described, performs the printing operation. The downward movement of the channel member and its subsequent upward movement to the position shown in Fig. 3 serve to operate a print wheel to bring a new printing character into recording position, and rotation of the crank 52 operates the switch 14.

Referring now to Figures 6 and 7 there is shown the carriage more or less in detail. The carriage 30 is supported at its front end by a roller 69 which is received in a channel member 70 that extends between the side plates 18 and 19. The rear end of the carriage is supported by means of rollers 71, 72 and 73 that ride on a shaft 74 which also extends between the side plates of the instrument. In this manner the carriage is mounted for movement back and forth between the side plates 18 and 19 when the motor 13 is rotated as a result of potentiometer unbalance. The carriage 30 has on one side a downwardly extending plate 75 that has a stud shaft 76 mounted therein. Pivoted on this stud shaft is a supporting member 77 that has a roller 78 journalled on its rear end, which roller is received by the channel member 68.

As shown more particularly in Figure 7 the other end of the member 77 which is on the left in Figure 6 and on the right in Figure 7 is provided with a stud shaft 79 which rotatably receives a sleeve 80 having a gear 81 attached to it. A print wheel 82 is mounted on this sleeve 80 and is maintained against rotation relative to the sleeve and to the gear 81 by means of a pin 81a that extends from the gear 81 and which is adapted to be received by a suitable opening in the side of the print wheel. This print wheel is provided with a plurality of printing characters 83 that extend from its periphery, and is shown herein as having 12 of these characters. With four thermocouples adapted to be connected in the circuit as is shown in Figure 1, each thermocouple will be represented by three of the printing characters on the print wheel. Therefore, upon one complete rotation of the print wheel the value of the condition of each of the thermocouples will have been recorded three times. In a like manner if two thermocouples are used, one rotation of the print wheel will record the value of each of the temperatures measured by the thermocouples six times whereas if twelve thermocouples are used, one rotation of the print wheel will record the values of each of the thermocouples once.

The stud shaft 76 upon which the member 77 is pivoted, is adapted to receive a sleeve 84 that has attached to it a gear 85 which is caused to rotate with the gear 81 by means of idlers 86. Also attached to the sleeve 84 is a ratchet 87. Ink pad supporting wheel 88 which has mounted on it 12 ink pads 89, one for each printing character, is slipped over the sleeve 84 and turned with that sleeve and with the ratchet and gear by means of a pin 89a extending from the ratchet that is adapted to be received by a suitable opening in the wheel 88. The print wheel 82 and the ink pad supporting member 88 are of such a diameter that the printing characters 83 will be pressed into the ink pads so that they will receive a supply of ink upon the rotation thereof.

The sleeve 84 is normally kept from rotating by means of engagement of a pawl 90 with the ratchet 87. This pawl is pivoted at 91 and is biased in a counterclockwise direction in Figure 7 by means of a spring 92. A pin 93 which extends from the pawl 90 engages a surface 94 of a second pawl 95 that is pivoted at 96 on the plate 75. This pawl is also biased in a counterclockwise direction in Figure 7 by means of a spring 97 that is equal in strength to the spring 92.

In the operation of the print wheel, as the channel 68 is moved upwardly the member 77 will be moved in a counterclockwise direction in Figure 6 or a clockwise direction in Figure 7 to bring a printing character 83 into engagement with a chart that is placed over a chart driving drum 98. Due to the shape of the curved portion 57 of the slot 56 in lever 58 the print wheel will be moved slowly into engagement with the chart with sufficient force to produce pressure printing, rather than hammer printing as is so often the case in multiple recording instruments. Pressing the printing character into engagement with the chart rather than dropping it into engagement therewith produces quieter operation as well as being easier on the various parts. When the print character engages the chart the spring 62 will flex to permit lever 58 to move through its full stroke. Upon continued rotation of crank 52 the lever 58, as has been described, will be moved downwardly in Figure 3. This means that the member 77 will be moved counterclockwise in Figure 7 with the pawl 90 in engagement with ratchet 87 thus preventing any relative rotation of the parts mounted on member 77. As this movement continues the pin 93 on pawl 90 will move to the right along the surface 94 until such time as the lever arm between pin 93 and the pivot 96 for pawl 95 has shortened enough for the force of spring 97 to overcome that of spring 92. At that time the pawl 95 will move into engagement with the ratchet 87 and, acting through the arm 94, will move pawl 90 out of engagement with the ratchet. This will occur at the bottom of the stroke of lever 58, and with the printing wheel in its highest position above the chart drum. Continued rotation of the crank 52 will then begin to move the lever 58 counterclockwise in Figure 3, which means that member 77 will move clockwise in Figure 7. During this movement the pawl 95 is in engagement with the ratchet 87 and will thereby prevent that ratchet and the gear 85 from rotating relative to the plate 75. While the member 77 is moved clockwise, however, idlers 86 and gear 81 upon which the print wheel is mounted will rotate, thereby moving the print wheel clockwise in Figure 7 and counterclockwise in Figure 6 to bring a new printing character into printing position above the chart drum. This is the second operation performed by the crank 52 as it rotates. As this clockwise movement of the part 77 continues the pin 93 will move away from the pivot point 96 and the lever arm between 93 and 96 will become large enough for spring 92 to overcome the force of spring 97. At this time the pawl 90 will move into and pawl 95 out of engagement with the ratchet 87 and maintain the parts in the position shown until the next printing operation occurs. It will be seen, therefore, that the ratchet is positively locked for movement with the part 77 by pawl 90 or is positively locked against movement by the pawl 95. At no time is the ratchet wheel, and therefore the print wheel, free to rotate because the pawls are so designed that pawl 90 is moved into engagement with a tooth of the ratchet as pawl 95 is moving out of engagement therewith. It will, therefore, be seen that as the crank 52 starts to rotate after the instrument has come into balance its movement will produce a printing operation and then an operation whereby a new printing character is brought into printing position above the chart. The time required for these operations is equal to the time required to rotate crank 52 one revolution. By properly designing the slot 56, 57 any necessary portion of this may be used respectively for the printing and indexing operation to take place.

Attached to the front end of the carriage 30 and movable therewith is a pointer 99 which cooperates with a scale 100 that is attached to the front of the channel member 70 and extends across the front of the machine. This pointer serves to indicate with the scale the position of the carriage and, therefore, the value of the condition. A cover member 101 extending between the side plates cooperates with the outer part of the slidewire support 31 to protect the print wheel from dust which may otherwise drop upon it.

The third operation of the crank 52 is performed by this crank as it rotates. Attached to the inner end of the shaft 51 is gearing 102 that acts to rotate a shaft 103 extending across the instrument. Another train of gearing 104 is rotated by shaft 103 to turn the arm 17 in switch 14. The gearing is so arranged that a complete rotation of the crank 52 will move the switch arm 17 from one segment 15 to the next segment to insert another thermocouple in the potentiometer circuit.

The records of the temperatures of the various thermocouples made by print wheel 82 are made upon a chart 105 that is supplied by a roll 106 which is suitably mounted between the side plates 18 and 19 of the instrument. The chart extends from this supply roll upwardly and rearwardly over the chart drum 98 and down in front of a chart backing plate 107 to a chart take-up roll 109 that is also mounted between the side plates. The chart backing plate 107 is pivoted at 108 so that when a new chart roll is to be put on the instrument, this plate can be swung out of the way to give access to the supports of the supply and take-up rolls. The take-up roll is frictionally driven in any suitable manner from the chart drum 98 so that as the drum feeds the chart past the print wheel it will be rewound on the take-up roll. A frictional drive is provided so that as the take-up roll gets larger the paper tension will not be increased.

The chart drum 98 is provided with driving pins 110 at each end thereof which extend through suitable perforations in the chart to pull the chart past its printing position. This chart drum is driven at a suitable rate of speed through worm and worm wheel gearing 111 by a shaft 112 that is in turn driven through bevel gearing 113 by a shaft 114. This shaft is suitably journalled in side plate 19 and serves as a bearing for part of the gearing 42 which drives the cam 40. Attached to the shaft 114 is a ratchet 115 which ratchet is driven by a pawl 122 that is mounted on a lever 116. The lever is free on the shaft 114 and is biased in a counterclockwise direction in Figure 3 by means of spring 117 so that a suitable adjusting screw 118 in its lower end is normally maintained in engagement with one of the surfaces of a cam 119 that is rotatable around the pivot 120 extending from the side plate 19. The upper end of lever 116 has mounted on it a cam-following roller 121 that is in the path of cam 40. Therefore, as the cam rotates the lever 116 will be moved clockwise against its bias upon each rotation thereof. The pawl 122 is biased into engagement with the ratchet 115 by means of a spring 123 so that upon each rotation of the cam and each clockwise movement of lever 116, the pawl serves to drive ratchet 115 and through the above mentioned gearing will drive the chart drum 98.

The amount of rotation imparted to the ratchet upon each oscillation of the lever 116 will depend upon the angular position of cam 119. If the cam is in the position shown in Figure 3 a maximum rotation of the ratchet 115 will be obtained. If, however, the cam is so positioned that one of the steps 124 is in the path of screw 118, then the lever 116 will be moved through a small angular distance, driving the chart drum a smaller distance for each rotation of the cam 40.

Generally speaking, if the temperature records of the various thermocouples are well spaced across the chart, the chart speed can be slower than if these records are closer together. If, for example, there are four thermocouples and the temperatures are well spaced across the range of the instrument, that means that a number of rotations of the cam 40 will take place between each printing operation, and therefore, the chart will be advanced certain amounts depending upon the spacing of the records. If, however, the records are close together the instrument will likely make a record upon each rotation of the cam 40 and the chart will not be advanced as much between the time a record of one thermocouple is made and the time that a record of that thermocouple is again made. In the latter case the chart should be advanced more upon each revolution of the cam 40 than would be the case if the records were further apart. In other words if the values of the temperatures being measured are close together, the carriage will not have to move much between records and therefore more records can be made in a given period of time. Since it is desirable for the chart to be moved fast enough to prevent overlapping of different records of the same temperature, it naturally follows that the chart should be moved faster if the values of the temperatures recorded are close together, than if they are widely separated across the chart. The type of record made, however, will be the same as that made with any conventional print wheel potentiometer and will depend upon the specific shape of the printing characters 83. It will, therefore, be seen that the chart drive of this application may be manually synchronized with the type of record that is to be made and the spacing of these records across the chart. Another important reason for having the printing operation and chart drive actuated by the same member is that the two operations may be so timed that printing never occurs while the chart is being moved. Thus no blurred records will be obtained. In Figure 9 there is shown a portion of a chart that is made by the instrument. It will be seen that each record consists of a plus mark with an identifying numeral beside it. The thermocouples 1 are so connected to the instrument by the switch 14 that the carriage 30 will move as near the same distance as possible across the chart between consecutive records. This means that the records will be substantially equally spaced along the length of the chart, the distance between them depending upon the chart speed.

From the above description it will be apparent that I have disclosed a multiple potentiometer recording instrument which is provided with a novel detector mechanism that serves to initiate a printing operation almost immediately after the carriage has been properly positioned. The operating means for the detector mechanism also serves to operate the chart drive so that it may be synchronized with the printing operations:

Having now described this invention, what I claim as new and desire to secure by Letters Patent is:

1. In a multiple potentiometer recording instrument having a chart upon which a record is to be made, recording mechanism adapted to record the value of a plurality of conditions, means to shift said recording mechanism to a position above the chart corresponding to the value of the condition then being measured, a part moved to either side of a neutral position depending upon the direction of movement of the recording mechanism, a constantly rotating cam cooperating with said part to return the same to its neutral position, means to operate said recording mechanism, means normally driven by said cam to drive said operating means, and means forming a portion of said part to disconnect said drive means if the part is not in its neutral position.

2. In a multiple potentiometer instrument having a chart, a printing element having a plurality of printing characters, means to move said element across said chart to a position corresponding to the value of a condition, a part movable to either side of a neutral position in response to movements of said element, a constantly rotating cam cooperating with said part to periodically return the part to its neutral position, driven means operative to sequentially move said element into printing engagement with said chart and then move the element to bring a new printing character into a position where it may be moved into engagement with the chart, drive means for said driven means on said cam and also cooperating with said part whereby if said part is out of its neutral position said drive means will not act on said driven means.

3. In a multiple potentiometer instrument of the self-balancing type, a printing element movable to a position corresponding to the value of a condition, a part movable therewith from a neutral position to indicate potentiometer unbalance, a cam to periodically return said part to its neutral position, drive means on said cam moved out of driving position by said part if said part is not in its neutral position, and driven means for said element to produce a printing operation thereby operated by said driving means when the latter is in driving position.

4. In a multiple potentiometer instrument of the self-balancing type, a printing element movable in response to unbalance of the potentiometer to a position corresponding to the value of a condition, a part movable in response to movement of the element from a neutral position, a constantly rotating cam cooperating with said part to periodically return the same to its neutral position, a pawl pivoted to said cam, driven means to produce a printing operation by said element and having a portion thereof in the path of said pawl to be driven thereby, a portion of said part acting to move said pawl out of its path when said part is not in its neutral position.

5. In a self-balancing potentiometer having a chart upon which a record is to be made, a carriage movable across the chart to a position corresponding to the value of a condition, a printing element movable with said carriage and adapted to be brought into printing engagement with the chart, a lever, a connection between said lever and element whereby movement of the former will produce a printing operation by the latter, a crank to move said lever, means to rotate said crank comprising a normally engaged clutch mechanism driven from a constantly rotating member, and means responsive to movement of said carriage across said chart to disengage said clutch.

6. In a self-balancing potentiometer having a chart upon which a record is to be made, a carriage movable across said chart to a position corresponding to the value of a condition, a printing element shiftable in said carriage into and out of engagement with the chart to make a record thereon, a part movable from a neutral position in response to movement of said carriage, a constantly rotating cam cooperating with said part to periodically return the same to its neutral position, a drive member pivoted to said cam, a driven member normally acted upon by said drive member, said part cooperating with said drive member to disengage the same from said driven member upon movement of the part from its neutral position, and connecting means between said driven means and said element whereby said element will be moved into printing engagement with the chart by the driven means when said carriage has stopped moving.

7. Mechanism to detect the movement of an element comprising a part frictionally moved by said element to one side or the other of a neutral position depending upon the movement of said element, said part having a V-notch formed in one edge thereof, a constantly rotating cam having a high portion adapted to engage one of the sides of said notch to periodically move said part to its neutral position, a member pivoted to a low portion of said cam and biased into a position in which one portion thereof is moved through a path that is obstructed by said part if the latter is out of its neutral position whereby said member is moved against its bias, said member having another portion normally positioned in a path and moved out of said path by engagement between said member and part, and means located in the path of the second mentioned portion of said member and driven thereby until said member is moved by said part.

8. Mechanism to detect the movement of an element comprising in combination a part having a notch with inclined edges formed in one edge thereof, means to move said part to either side of a neutral position, a cam movable through a fixed path and having a portion adapted to be moved through said notch to engage one side thereof to return said part to its neutral position, a driving member movable through a path in timed relation with said cam and being so positioned that it will engage a portion of said part and be moved thereby out of its path if said part is not in its neutral position, said member not engaging said part if the latter is in its neutral position, a driven member to be moved by said driving member as the latter moves through its path, said driven member not being moved by said driving member if the latter is moved out of its path by said part.

9. Mechanism to detect movement of an element comprising in combination a part having a V-shaped notch in one edge thereof and pivoted about an axis, means to move said part to either side of a neutral position, a constantly rotating cam having a high portion adapted to extend into said notch to engage one of the sides thereof to periodically return said part to a neutral position, a pawl pivoted to a low portion of said cam, a spring to resiliently bias said pawl to a position in which a portion thereof may be engaged by the ends of the notch on said part if said part is not in its neutral position to move said pawl, said pawl being out of the path of said part if said part is in its neutral position, and mechanism to be driven by said pawl when the latter is in its spring biased position whereby said mechanism will be driven only if said part is in its neutral position.

10. In combination with a measuring instrument, an element movable to a position corresponding to the value of a condition, a part having a V-shaped notch in one edge thereof mounted for movement around an axis, means to move said part around its axis from a neutral position in accordance with the movement of said element, a constantly rotating cam the periphery of which is adapted to engage the sides of said notch to periodically return said part to its neutral position, a pawl pivoted on said cam in a position to be engaged by the portion of said part forming the ends of said notch if said part is not in its neutral position, and mechanism to be operated or not by said pawl depending upon whether said pawl is engaged by said part.

11. In a multiple potentiometer instrument having a chart upon which a record is to be made, a printing element having a plurality of printing characters, means to move said element across the chart to a position corresponding to the value of a condition, a detecting part movable to either side of a neutral position in response to movements of said element, a cam operating to return periodically said part to its neutral position, driven means operative through a cycle upon movement thereof to move said printing element in engagement with the chart and then move said printing element to bring a new printing character into a position where it may be moved into engagement with the chart, and drive means to move said driven means, said drive means being operated by said cam and also cooperating with said detecting part whereby if said detecting part is out of neutral position said detecting part will shift said drive means to a position in which it will not move said driven part.

12. In a self-balancing potentiometer having a chart upon which a record is to be made, a carriage movable across the chart to a position corresponding to the value of a condition, a printing element movable with said carriage and operative to be brought into engagement with the chart, a lever to operate said printing element to make a record, a rotatable member to move said lever, means to rotate said member at times including as a part thereof a clutch operated from a constantly driven power source, and means responsive to movement of said carriage across the chart to disengage said clutch and thereby keep from performing a printing operation if said carriage is moving.

13. Mechanism to detect movement of an element comprising in combination a part having a V-shaped notch formed therein, means to pivot said part for movement about an axis, means to move said part to either side of a neutral position when the element moves, a cam having a high portion adapted to extend into said notch to engage one of the sides thereof and to return periodically said part to its neutral position, a pawl pivoted to said cam in a predetermined relation to said high portion thereof, means to hold said pawl in a position in which it may be engaged by said part adjacent the end of said notch to move said pawl if said part is not in its neutral position, and mechanism to be driven by said pawl when it has not been engaged by said part whereby said mechanism will be driven only if said part is in its neutral position.

GEORGE A. GRUSS.